United States Patent
Honda et al.

(10) Patent No.: US 8,714,588 B2
(45) Date of Patent: May 6, 2014

(54) SIDE AIRBAG APPARATUS

(71) Applicant: Toyoda Gosei Co., Ltd., Kiyosu (JP)

(72) Inventors: Kensaku Honda, Aichi-ken (JP); Yuji Sato, Aichi-ken (JP); Masashi Hotta, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/752,500

(22) Filed: Jan. 29, 2013

(65) Prior Publication Data

US 2013/0200598 A1  Aug. 8, 2013

(30) Foreign Application Priority Data

Feb. 8, 2012  (JP) .................................. 2012-025253

(51) Int. Cl.
*B60R 21/231* (2011.01)

(52) U.S. Cl.
USPC ...................... 280/730.2; 280/729; 280/743.1

(58) Field of Classification Search
USPC .................. 280/730.2, 730.1, 729, 743.1, 739
See application file for complete search history.

(56) References Cited

U.S. PATENT DOCUMENTS

| | | | | |
|---|---|---|---|---|
| 5,586,782 A | * | 12/1996 | Zimmerman et al. | 280/730.2 |
| 5,725,244 A | * | 3/1998 | Cundill | 280/739 |
| 6,062,594 A | * | 5/2000 | Asano et al. | 280/730.2 |
| 6,106,004 A | * | 8/2000 | Heinz et al. | 280/729 |
| 7,192,050 B2 | * | 3/2007 | Sato et al. | 280/729 |
| 7,637,530 B2 | * | 12/2009 | Yamaji et al. | 280/730.2 |
| 7,997,614 B2 | * | 8/2011 | Ishikawa et al. | 280/739 |
| 8,419,050 B2 | * | 4/2013 | Yoo | 280/729 |
| 8,480,124 B2 | * | 7/2013 | Rickenbach et al. | 280/730.2 |
| 2004/0124615 A1 | * | 7/2004 | Tanase et al. | 280/730.2 |
| 2006/0001244 A1 | * | 1/2006 | Taguchi et al. | 280/729 |
| 2009/0020987 A1 | | 1/2009 | Wipasuramonton et al. | |
| 2012/0025499 A1 | * | 2/2012 | Shibayama et al. | 280/730.2 |
| 2013/0033022 A1 | | 2/2013 | Yamamoto | |

FOREIGN PATENT DOCUMENTS

| | | |
|---|---|---|
| JP | 10-100827 A | 4/1998 |
| JP | 2006-008016 A | 1/2006 |
| JP | 2009-023640 A | 2/2009 |
| JP | A-2010-137615 | 6/2010 |
| JP | A-2010-228519 | 10/2010 |
| JP | A-2011-5908 | 1/2011 |
| WO | 2011/132316 A | 10/2011 |

OTHER PUBLICATIONS

European Search Report dated Apr. 12, 2013 in corresponding EPO application 13153093.3.

* cited by examiner

*Primary Examiner* — Nicole Verley
(74) *Attorney, Agent, or Firm* — Posz Law Group, PLC

(57) ABSTRACT

A side airbag apparatus has an inflatable portion, which is deployed and inflated on a side of a seat of a vehicle by inflation gas. The inflatable portion is divided into upstream and downstream sections by a partitioning member including a valve having an opening and a pair of valve body elements. Immediately after the beginning of the supplying of the gas, the valve body elements remain in contact with each other to close the valve. When the upstream section restrains an occupant, a force is exerted to the partitioning member by the occupant, which causes the partitioning member to warp and the valve body elements to be separated from each other to open the valve. The upstream section has a shoulder-protecting portion, which is deployed and inflated on a side of a region of the occupant including a rear end part and a middle part of a shoulder.

4 Claims, 9 Drawing Sheets

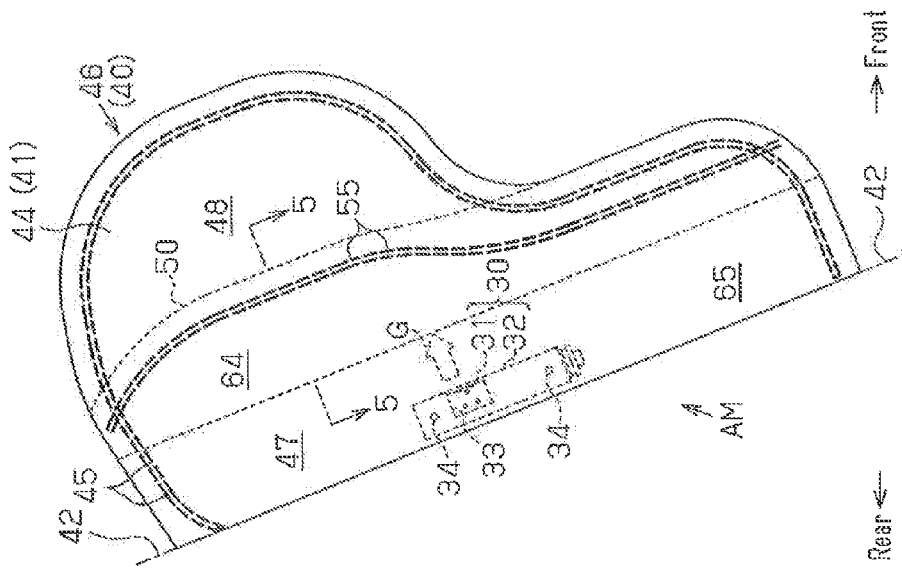
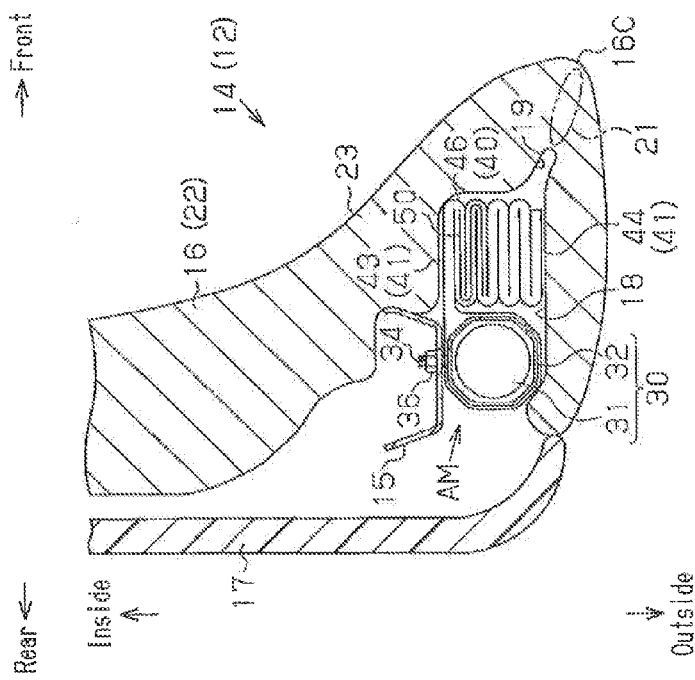

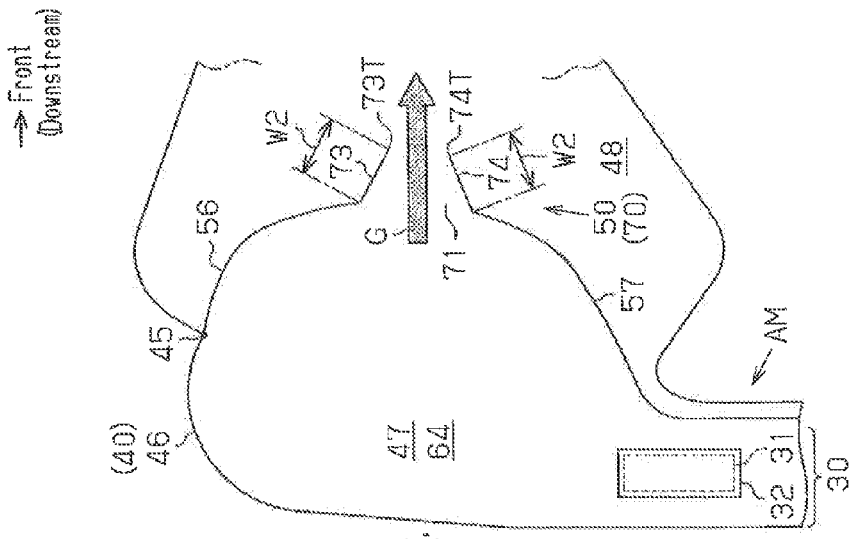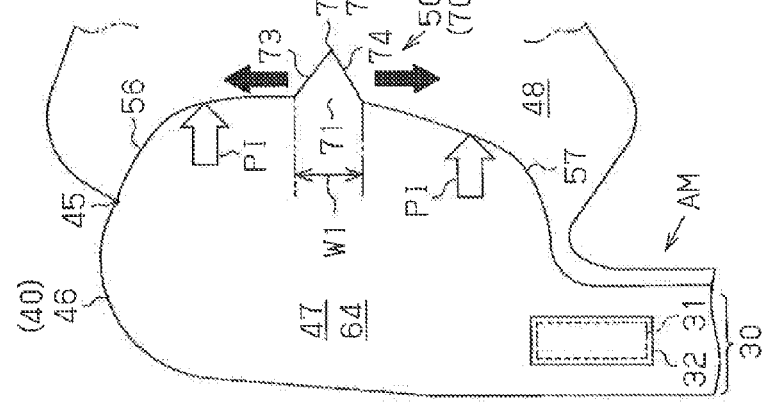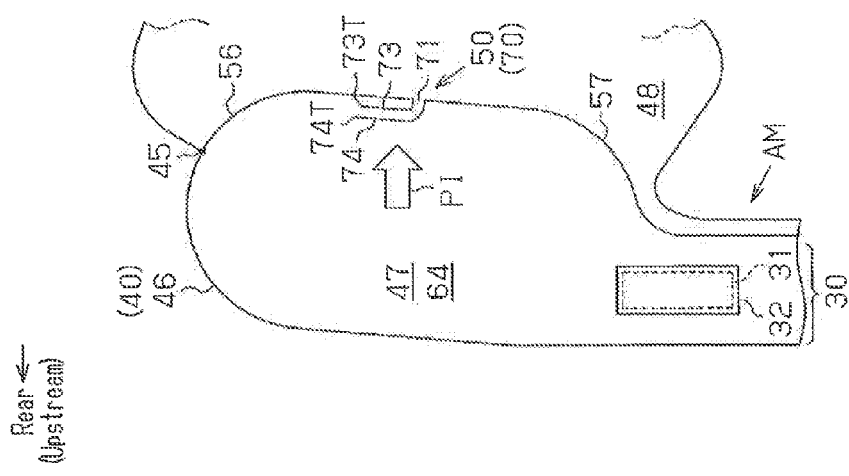

SIDE AIRBAG APPARATUS

BACKGROUND OF THE INVENTION

The present invention relates to a side airbag apparatus, which deploys and inflates an airbag on one side of an occupant seated in a seat of a vehicle to protect the occupant from an impact applied to the vehicle from the side of the seat.

A side airbag apparatus including an airbag and an inflator for protecting an occupant seated in a seat from an impact applied to a vehicle from the side of the seat in the event of a side collision, for instance, is widely known. The airbag of this kind of side airbag apparatus is accommodated in a backrest (seat back) of the seat in a folded state together with the inflator. When an impact is applied to a body-side portion, such as a side door, of the side of the vehicle, the side airbag apparatus supplies inflation gas into the airbag from the inflator. The inflation gas causes the airbag to be deployed and inflated out of the seat with part of the airbag left within the seat back. The airbag is deployed and inflated toward the front of the vehicle into a narrow space between the occupant seated in the seat and the body-side portion. The airbag thus deployed and inflated is positioned between the occupant and part of the body-side portion that protrudes inward into the interior of the vehicle and restrains the occupant, thereby mitigating the impact applied from the side to the occupant through the body-side portion.

The aforementioned type of side airbag apparatus is described in Japanese Laid-Open Patent Publication No. 2011-5908, for example, in which the side airbag apparatus deploys and inflates an airbag in a deployment area encompassing the head and lumbar region of an occupant by means of inflation gas supplied from an inflator in response to impact applied from the side.

As depicted in FIG. 12, an airbag 80 described in Japanese Laid-Open Patent Publication No. 2011-5908 includes a main inflatable portion 81, a head-protecting inflatable portion 82, a lumbar-region-protecting inflatable portion 83, and a non-inflatable portion 84. The main inflatable portion 81 constitutes a rear part of the aforementioned deployment area DA, the head-protecting inflatable portion 82 constitutes an upper front part of the deployment area DA and the lumbar-region-protecting inflatable portion 83 constitutes a lower front part of the deployment area DA. The non-inflatable portion 84 is located between the head-protecting inflatable portion 82 and the lumbar-region-protecting inflatable portion 83. An upper part of the main inflatable portion 81 and the head-protecting inflatable portion 82 are separated from each other by an upper partition 87 having an upper conducting path 86, while a lower part of the main inflatable portion 81 and the lumbar-region-protecting inflatable portion 83 are separated from each other by a lower partition 89 having a lower conducting path 88. An upper check valve 91 is provided in the upper conducting path 86 for preventing the inflation gas G from flowing from the head-protecting inflatable portion 82 into the main inflatable portion 81, while a lower check valve 92 is provided in the lower conducting path 88 for preventing the inflation gas G from flowing from the lumbar-region-protecting inflatable portion 83 into the main inflatable portion 81.

According to the above-described side airbag apparatus, the inflation gas G is supplied from an inflator 85 into the main inflatable portion 81 when an impact is applied from the side to a vehicle. The upper partition 87 acts as resistance to a flow of the inflation gas G from the main inflatable portion 81 into the head-protecting inflatable portion 82. Also, the lower partition 89 acts as resistance to a flow of the inflation gas G from the main inflatable portion 81 into the lumbar-region-protecting inflatable portion 83. Therefore, the inflation gas G supplied from the inflator 85 cannot easily flow into the head-protecting inflatable portion 82 and the lumbar-region-protecting inflatable portion 83, so that the inflation gas G is first filled into the main inflatable portion 81. The inflation gas G thus supplied causes the main inflatable portion 81 to be deployed and inflated in an entire rear portion of the deployment area DA.

When the internal pressure of the main inflatable portion 81 increases as a consequence, part of the inflation gas G within the main inflatable portion 81 flows into the head-protecting inflatable portion 82 through the upper conducting path 86, causing the head-protecting inflatable portion 82 to be deployed and inflated in the upper front part of the deployment area DA. Also, part of the inflation gas G within the main inflatable portion 81 flows into the lumbar-region-protecting inflatable portion 83 through the lower conducting path 88, causing the lumbar-region-protecting inflatable portion 83 to be deployed and inflated in the lower front part of the deployment area DA. When the head-protecting inflatable portion 82 and the lumbar-region-protecting inflatable portion 83 are deployed and inflated in this fashion, the internal pressure of the main inflatable portion 81 is increased. Thus, the main inflatable portion 81 functions as a pillar having high strength and thereby restrict the head-protecting inflatable portion 82 from swinging downward and the lumbar-region-protecting inflatable portion 83 from swinging upward. This serves to improve stability of the shape of the airbag 80 which has been deployed and inflated. Accordingly, when the vehicle's body-side portion intrudes into the vehicle interior as a result of an impact that activates the side airbag apparatus, the head-protecting inflatable portion 82 is positioned on the side of the head PH of the occupant P and the lumbar-region-protecting inflatable portion 83 is positioned on the side of the lumbar region PP.

Further, the upper check valve 91 and the lower check valve 92 prevent the inflation gas G from flowing from the head-protecting inflatable portion 82 into the main inflatable portion 81 and from the lumbar-region-protecting inflatable portion 83 into the main inflatable portion 81, respectively. It is therefore possible to increase the internal pressure of the main inflatable portion 81 at an early stage of deployment and inflation of the airbag 80 and then deploy and inflate the head-protecting inflatable portion 82 and the lumbar-region-protecting inflatable portion 83 without causing these portions 82, 83 to swing downward or upward. After the head-protecting inflatable portion 82 and the lumbar-region-protecting inflatable portion 83 have been deployed and inflated, the head-protecting inflatable portion 82 and the lumbar-region-protecting inflatable portion 83 maintain a high internal pressure so that these portions 82, 83 can protect the head PH and the lumbar region PP, respectively.

In the meantime, the side airbag apparatus is configured so that the airbag 80 is deployed and inflated in the space between an occupant P seated in the seat and the vehicle's body-side portion to absorb an impact as described above. Thus, the space allowed for deployment and inflation of the airbag 80 is narrower as compared to other types of collisions than a side collision (e.g., a frontal collision). This space for deployment and inflation of the airbag 80 varies with the size of the vehicle. Generally speaking, the smaller the vehicle size, the narrower the space. Furthermore, the space available for deployment and inflation of the airbag 80 varies with the body size of the occupant P; that is to say, the larger the occupant P, the narrower the space. What is important is that the airbag 80 can be reliably deployed and inflated in such a narrow space to reliably protect the occupant P.

Under such circumstances, it has been proposed to maintain a space for deploying and inflating the head-protecting inflatable portion 82 and the lumbar-region-protecting inflatable portion 83 by pushing and moving the occupant P more inward into the vehicle interior by the main inflatable portion 81, which is deployed and inflated.

The side airbag apparatus described in Japanese Laid Open Patent Publication No. 2011-5908 is configured such that the main inflatable portion 81, which is deployed and inflated, pushes the occupant P into the vehicle interior in the back PB. However, as viewed from above, since the outline of the back PB of the occupant P curved inward of the vehicle toward rear end of the vehicle, it is difficult to push the back PB inward by the main inflatable portion 81 and move the occupant P farther inward into the vehicle interior. Accordingly, it is desired to efficiently move the occupant P more inward into the vehicle interior by maintaining an airbag deployment space to provide improved performance for protecting the occupant P.

SUMMARY OF THE INVENTION

Accordingly, it is an objective of the present invention to provide a side airbag apparatus that can efficiently move an occupant more inward into the interior of a vehicle by an inflatable portion of an airbag in response to an impact applied from a side of the vehicle, thereby providing improved performance for protecting the occupant.

To achieve the foregoing objective, and in accordance with one aspect of the present invention, a side airbag apparatus having a gas generating source and an airbag including an inflatable portion is provided. The gas generating source supplies inflation gas to the airbag in response to an impact applied from a side of a seat of a vehicle. The inflatable portion which is deployed and inflated forward by the inflation gas on a side of an occupant seated in the seat to restrain the occupant. The inflatable portion is divided into an upstream section and a downstream section by a partitioning member. The inflation gas is supplied from the gas generating source into the upstream section. The downstream section is located in front of and adjacent to the upstream section. The partitioning member includes a valve capable of selectively allowing and restricting flow of the inflation gas from the upstream section to the downstream section. The partitioning member has an opening and a pair of valve body elements. In an initial stage of a gas feeding period during which the inflation gas is supplied, the pair of valve body elements are pushed to remain in contact with each other by the inflation gas fed into the upstream section to restrict the flow of the inflation gas from the upstream section to the downstream section through the opening. In a state in which the upstream section has inflated and restrained the occupant, the pair of valve body elements are separated from each other to allow the flow of the inflation gas through the opening in the partitioning member when the partitioning member is caused to warp by an external force exerted from the occupant as a result of restraining the occupant. The upstream section has a shoulder-protecting portion, which is deployed and inflated on a side of a region of the occupant including at least a rear end part and a middle part of a shoulder of the occupant.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a partially cross-sectional plan view depicting an airbag module accommodated in an accommodating portion according to the seat back of the embodiment depicted in FIG. 1;

FIG. 4 is a side view of the airbag module in a state in which an airbag has been deployed but not yet inflated according to the embodiment depicted in FIG. 1;

FIGS. 10A to 10C are diagrams schematically depicting how the pressure-regulating valve works according to the embodiment;

DETAILED DESCRIPTION OF THE PREFERRED EMBODIMENTS

A side airbag apparatus according to a preferred embodiment of the present invention installed in a vehicle will be described hereinbelow with reference to FIGS. 1 to 11.

In the following, the direction in which a vehicle advances forward will be referred to as the front, and the reverse direction will be referred to as the rear. The up-down direction refers to the up-down direction of the vehicle. The middle of the width direction of the vehicle is used as reference in the width direction of the vehicle. A side closer to the middle of the width direction will be referred to as "inner side" of the vehicle, while a side farther from the vehicle center will be referred to "outer side" of the vehicle.

Figure 1:
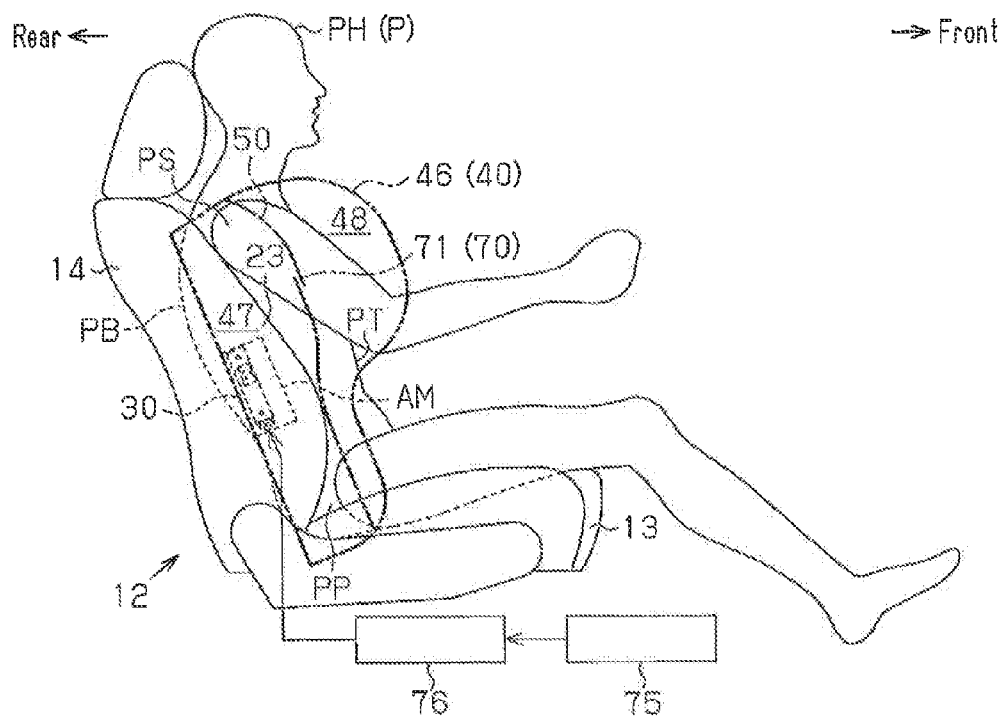
FIG. 1 is a side view depicting an occupant and a seat provided with a side airbag apparatus according to one embodiment of the invention.
Figure 2:
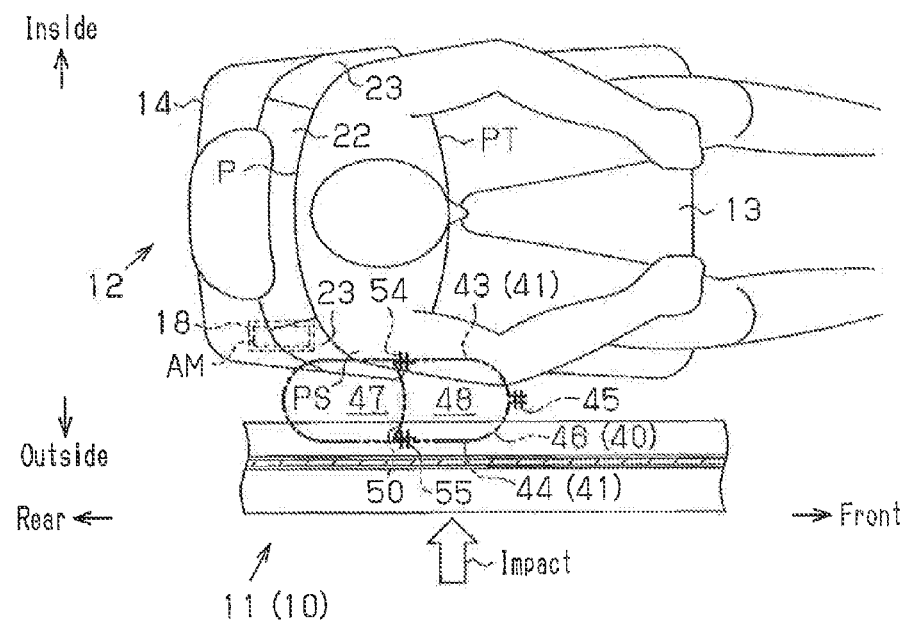
FIG. 2 is a partially cross-sectional plan view depicting a relationship among positions of the seat, the occupant, and a body-side portion of a vehicle according to the embodiment depicted in FIG. 1.

Referring to FIGS. 1 and 2, a seat 12 is installed in the vicinity of a body-side portion 11 of a vehicle 10 in the vehicle interior (an upper side as illustrated in FIG. 2). The body-side portion 11 referred to herein means a combination of constituent components of the vehicle 10 chiefly including a door and a pillar. For example, the body-side portion 11 of a front seat includes a front door and a center pillar (B-pillar). Also, the body-side portion 11 of a rear seat includes a rear part of a side door (rear door), a C-pillar, a front part of a wheel house and a rear quarter panel.

The seat 12 includes a seat cushion 13 and a seat back 14 which extends upward from a rear end of the seat cushion 13. Provided with a reclining mechanism (not shown), the seat back 14 can be adjusted to a desired tilt angle. The seat 12 is installed on the vehicle 10 with the seat back 14 oriented forward. The widthwise direction of the installed seat 12 matches the widthwise direction of the vehicle 10.

The seat back 14 includes a main seat-back portion 22 and a pair of side support portions 23 provided on left and right sides of the main seat-back portion 22. The main seat-back portion 22 is inclined rearward to support an upper part of the body of an occupant P from behind. The side support portions 23 which protrude forward from the main seat-back portion 22 on both sides restrain the occupant P seated on the seat cushion 13 and reclining against the main seat-back portion 22 from moving in the widthwise direction.

Described next hereunder is the internal structure of an outer lateral portion of the seat back 14 including the outside side support portion 23.

A seat frame constituting a framework of the seat back 14 is incorporated therein. Part of the seat frame is located in an outer portion (a lower side as illustrated in FIG. 3) of an inside space of the seat back 14. This part of the seat frame is referred to as a side frame portion 15. The side frame portion 15 is formed by bending a metal sheet. A seat pad 16 made of an elastic material like urethane foam is placed in front of the seat frame including the side frame portion 15. Provided behind the seat frame is a back board 17, which is made of a hard material like plastic. While the seat pad 16 has a surface covering, the surface covering is not illustrated in FIG. 3. Likewise, the surface covering of the seat pad 16 is not illustrated in FIG. 6.

An accommodating portion 18 is provided in the seat pad 16 close to an outside part of the side frame portion 15. The accommodating portion 18 is located obliquely behind the occupant P seated in the seat 12. The accommodating portion 18 accommodates an airbag module AM which constitutes a principal portion of the side airbag apparatus, the airbag module AM including an inflator assembly 30 and an airbag 40.

The accommodating portion 18 has a corner at an outer front position in which a slit 19 extending outwardly forward is formed. A portion of the seat pad 16 located between a front corner 16C of the seat pad 16 and the slit 19 (i.e., a portion surrounded by a closed alternate long and two short dashed line in FIG. 3) constitutes a breakable portion 21, which will be broken by the airbag 40.

The components of the airbag module AM will now be described. In the present embodiment, the up-down direction and the front-rear direction of the airbag module AM and its components are defined with reference to the seat back 14 of the seat 12 as shown in FIG. 1. The direction in which the seat back 14 extends upward is defined as the up-down direction of the airbag module AM and its components, and the thickness direction of the seat back 14 is defined as the front-rear direction of the airbag module AM and its components. As described above, the seat back 14 is slightly inclined backward in normal use. Thus, in a strict sense, the up-down direction of the airbag module AM and its components does not match the up-down direction (vertical direction) of the vehicle 10, but is slightly inclined. Likewise, the front-rear direction of the airbag module AM and its components does not match the front-rear direction of the vehicle (the horizontal direction), but is slightly inclined.

<Inflator Assembly 30>

Referring to FIGS. 3 and 4, the inflator assembly 30 includes an inflator 31, which is a gas generating source, and a retainer 32 provided on the outside of the inflator 31. The present embodiment employs a pyrotechnic type inflator as the inflator 31. Having generally a cylindrical shape, the inflator 31 contains in the internal space thereof a gas generating agent (not shown) from which inflation gas G is released. A cable harness (not shown) containing wires for feeding an activation signal to the inflator 31 is connected to one lengthwise end of the inflator 31 (a lower end in the present embodiment).

Instead of the pyrotechnic type inflator, which uses the aforementioned gas generating agent, a hybrid-type inflator, which spews out inflation gas by breaking a partition of a high-pressure steel gas cylinder, which contains high-pressure gas filled therein, may be employed as the inflator 31.

The retainer 32, on the other hand, functions as a diffuser and serves also to join the inflator 31 to the side frame portion 15 together with the airbag 40. A major part of the retainer 32 forms a generally cylindrical shape obtained by bending a metal sheet. A window 33 is formed in the retainer 32 so that most of the inflation gas G released from the inflator 31 spews out of the retainer 32 through this window 33.

A plurality of bolts 34 used for attaching the retainer 32 to the side frame portion 15 are fixed to the retainer 32. Expressed differently, the plurality of bolts 34 are indirectly fixed to the inflator 31 via the retainer 32.

The inflator assembly 30 may be configured with the inflator 31 and the retainer 32 formed integrally as a single-structured unit.

<Airbag 40>

Referring to FIGS. 1 and 2, the inflation gas G released from the inflator 31 is fed into the airbag 40 when an impact is applied to the vehicle 10 (body-side portion 11) from the side of the seat 12 in the event of a side collision, for instance. In this case, the airbag 40 is deployed generally forward with part of a rear portion of the airbag 40 left within the seat back 14. The airbag 40 deployed and inflated is positioned in the vicinity of the occupant P seated in the seat 12, that is, between the upper part of the body of the occupant P and the body-side portion 11 in this embodiment, to protect most of the upper part of the body of the occupant P from the impact caused by the side collision.

Figures 7A, 7B:
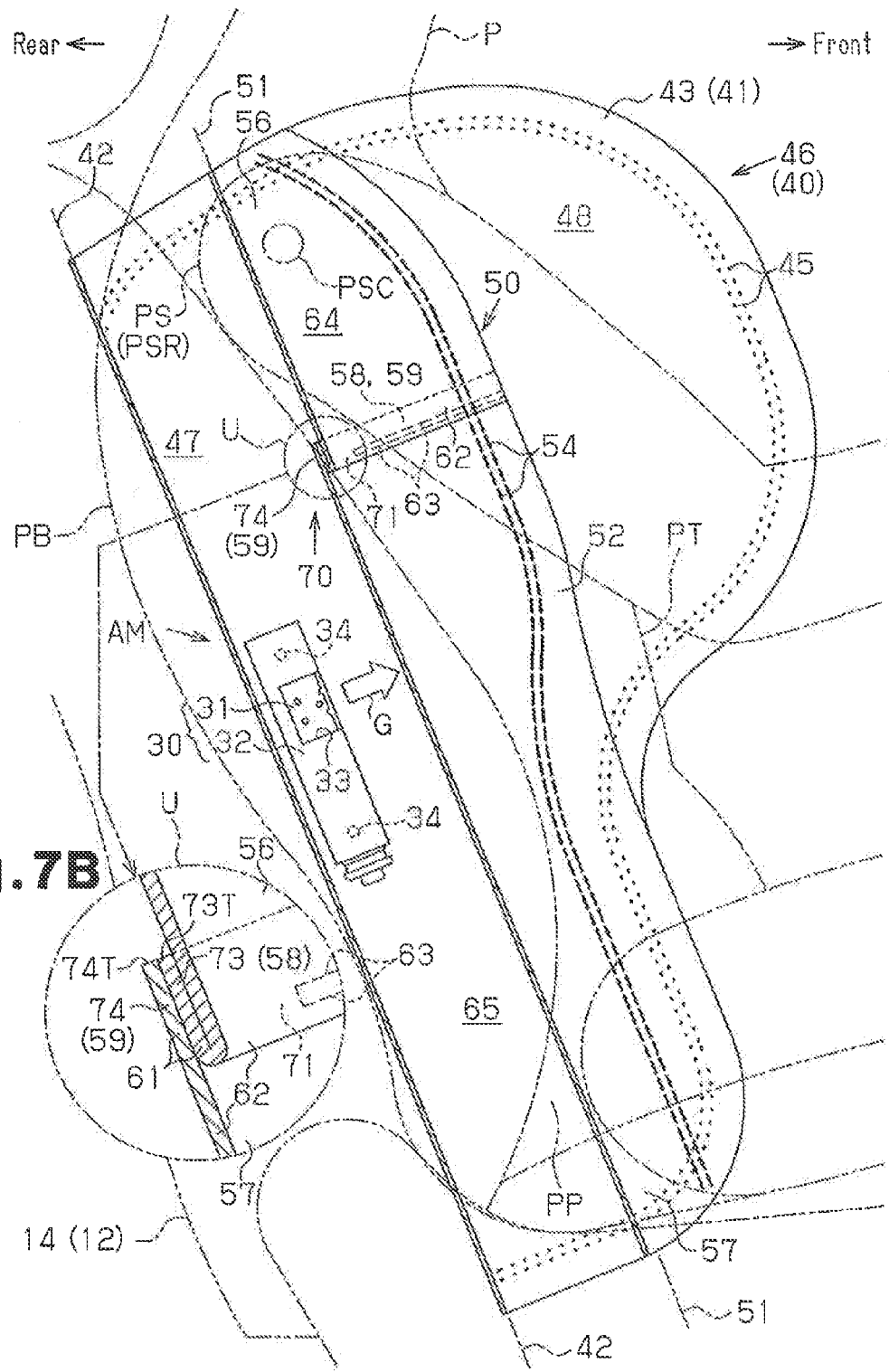
FIG. 7A is a partially cross-sectional side view of the airbag module, of which the airbag is sectioned at the middle of the width thereof in the state depicted in FIG. 4 where the airbag has been deployed but not yet inflated.
FIG. 7B is an enlarged partial cross-sectional side view of a portion marked by a circle U in FIG. 7A.

FIG. 4 depicts the airbag module AM in a state in which the airbag 40 has been deployed in a flat shape but not yet inflated. Also, FIGS. 7A and 7B depict the internal structure of the airbag module AM together with the seat 12 and the occupant P. FIG. 7A depicts the airbag module AM of which airbag 40 is sectioned at the middle of the width thereof in the state depicted in FIG. 4.

Referring to FIGS. 4, and 7A, the airbag 40 is formed by folding a piece of fabric 41 (i.e., base fabric, also known as panel fabric) in half widthwise along a folding line 42 defined on a center line of the fabric 41 and joining overlapped parts of the folded fabric 41 together along an outer edge thereof to form the shape of a bag. For the sake of explanation in this description, a portion of the folded fabric 41 of the airbag 40 placed inside is referred to as a fabric portion 43 (refer to FIG.

7A) and a portion of the folded fabric 41 placed outside is referred to as a fabric portion 44 (refer to FIG. 4) to distinguish between these portions.

While the fabric 41 is folded in half such that the folding line 42 is located at a rear end of the airbag 40, the fabric 41 may be folded in half such that the folding line 42 is located at another end of the airbag 40, such as a front end, an upper end or a lower end thereof. Also, the airbag 40 may be formed from two pieces of fabric divided along the aforementioned folding line 42. In this case, the airbag 40 is formed by laying one piece of fabric on another widthwise and joining the two pieces of fabric to together form the shape of a bag. Furthermore, the airbag 40 may be formed from three or more pieces of fabric.

The two fabric portions 43, 44 of the airbag 40 are symmetrical in outer shape with respect to the folding line 42. The shape and size of each of the fabric portions 43, 44 are determined such that the airbag 40 aligns with most of the upper part of the body of the occupant P seated in the seat 12 (including such portions of the body as lumbar region PP, thorax PT and shoulder PS) when the airbag 40 is deployed and inflated between the seat 12 and the body-side portion 11.

A material suited for the aforementioned fabric portions 43, 44 is a woven fabric made of polyester or polyamide fibers, for instance, which has high strength and flexibility and can be easily folded.

The two fabric portions 43, 44 are joined together along a peripheral joint part 45 provided on peripheries of the fabric portions 43, 44. In this embodiment, the peripheral joint part 45 is formed by stitching peripheral portions of the fabric portions 43, 44 excluding rear ends thereof (i.e., the vicinity of the folding line 42).

In FIGS. 4, 7A, 8 and 9, stitched portions of the airbag 40 are represented by two kinds of lines. One of these kinds of lines is a broken line, which represents each of the stitched portions (refer to FIG. 4) as seen from the outside of the airbag 40. The other kind of line is a dotted line, which represents how the stitched portions of the airbag 40 are formed between the fabric portions 43, 44 (refer to the peripheral joint part 45 depicted in FIG. 7A). That is to say, the drawings representing the stitched portions by dotted lines depict a cross-sectional structure along a plane that cuts the stitched portions.

Referring to FIGS. 4 and 7A, when a portion of the airbag 40 confined by the peripheral joint part 45 of the fabric portions 43, 44 is filled with the inflation gas G, this portion is deployed and inflated on one side of the upper part of the body of the occupant P to thereby protect most of the upper part of the body of the occupant P from an impact.

The peripheral joint part 45 may be formed by bonding the peripheries of the fabric portions 43, 44 with an adhesive, for example.

The inflator assembly 30 is located generally in the up-down direction of the seat back 14 in a rear end portion of the airbag 40. The bolts 34 of the retainer 32 are passed through the inside fabric portion 43 (refer to FIG. 3). The bolts 34 are passed and fastened in this way to position and fix the inflator assembly 30 relative to the airbag 40.

An inflatable portion 46 of the airbag 40 is divided into a plurality of sections by a partitioning member 50, which extends in a sheet form within the inflatable portion 46. The partitioning member 50 is structured in the same manner as a known tether.

Figure 5:
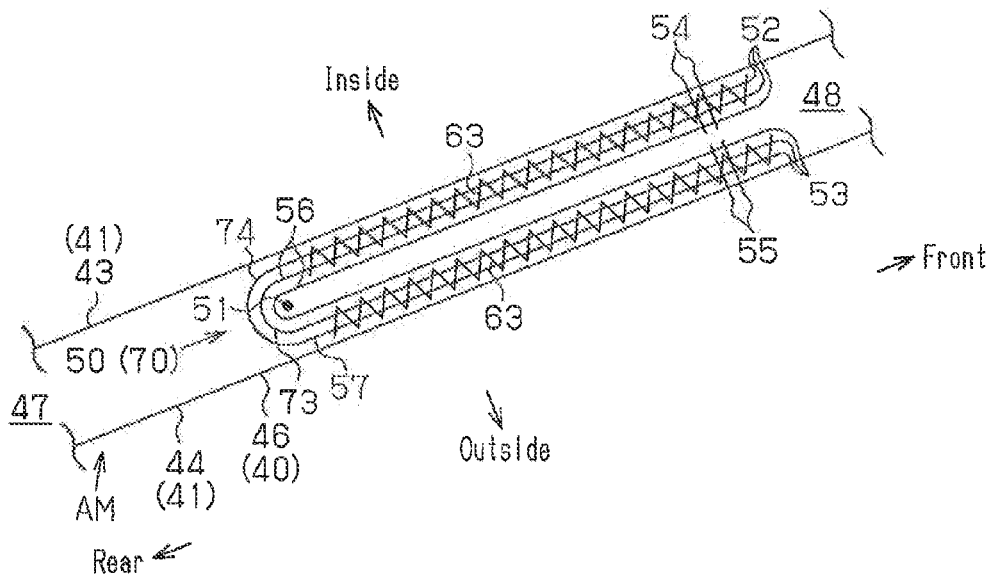
FIG. 5 is an enlarged partial cross-sectional view schematically depicting a cross-sectional structure of a partitioning member taken along line 5-5 of FIG. 4.

FIG. 5 depicts a cross-sectional structure taken along line 5-5 of FIG. 4. FIG. 5 represents each member without depicting the thickness. When the airbag 40 has been deployed but not yet inflated, the partitioning member 50 is folded in half along a folding line 51, which extends generally in the up-down direction, so that opposite end portions 52, 53 of the partitioning member 50 face close to each other as depicted in FIGS. 5 and 7A. The partitioning member 50, which is folded in half, is located in the inflatable portion 46 such that the folding line 51 is located on an upstream side (i.e., the side close to the inflator 31) of the inflation gas G while the two opposite end portions 52, 53 are located on a downstream side (i.e., the side separated from the inflator 31) of the inflation gas G.

Figure 8:
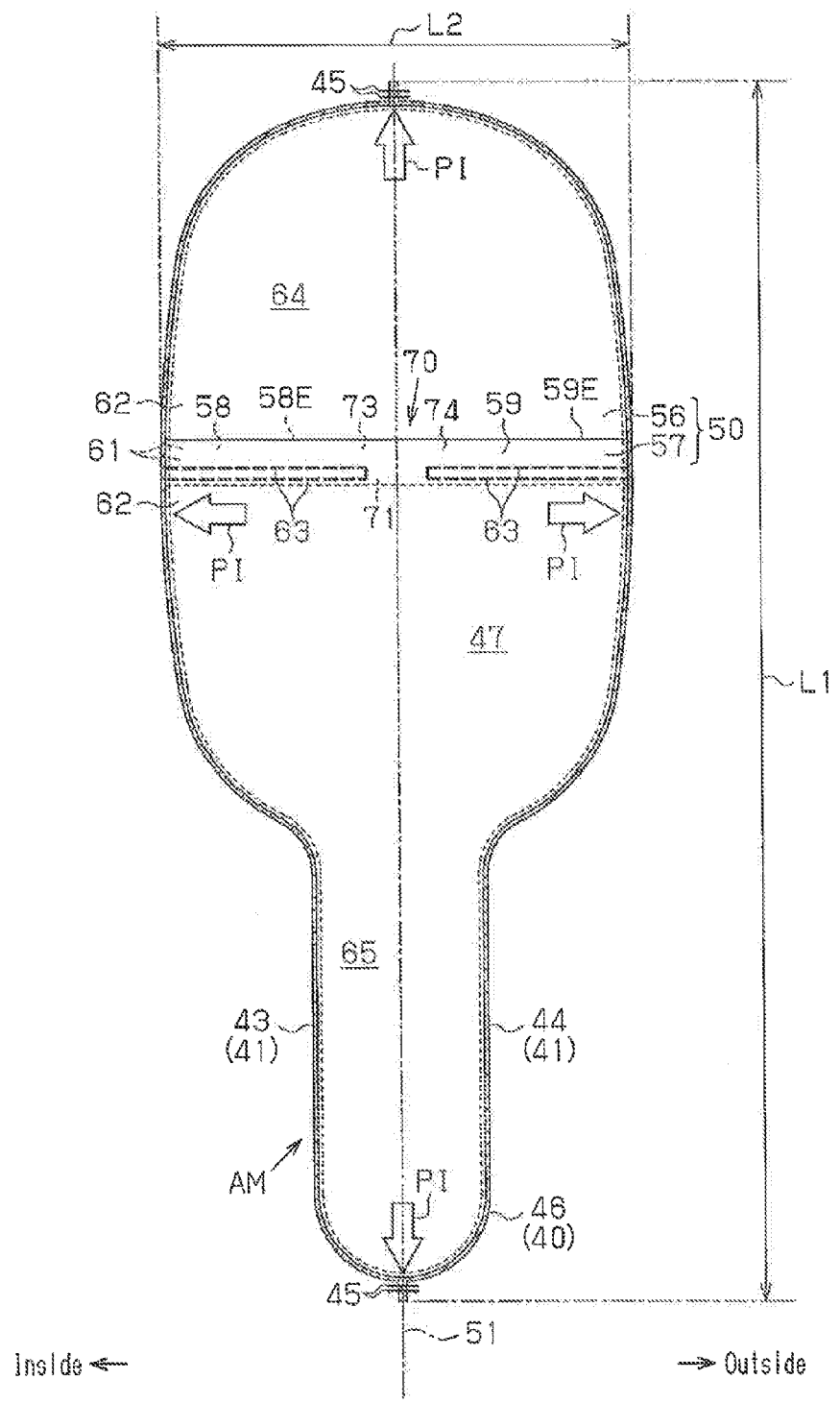
FIG. 8 is a cross-sectional view depicting the internal structure of the airbag module of the embodiment, in which the partitioning member is stretched tight with the airbag deployed and inflated as seen from an upstream side.
Figure 9:
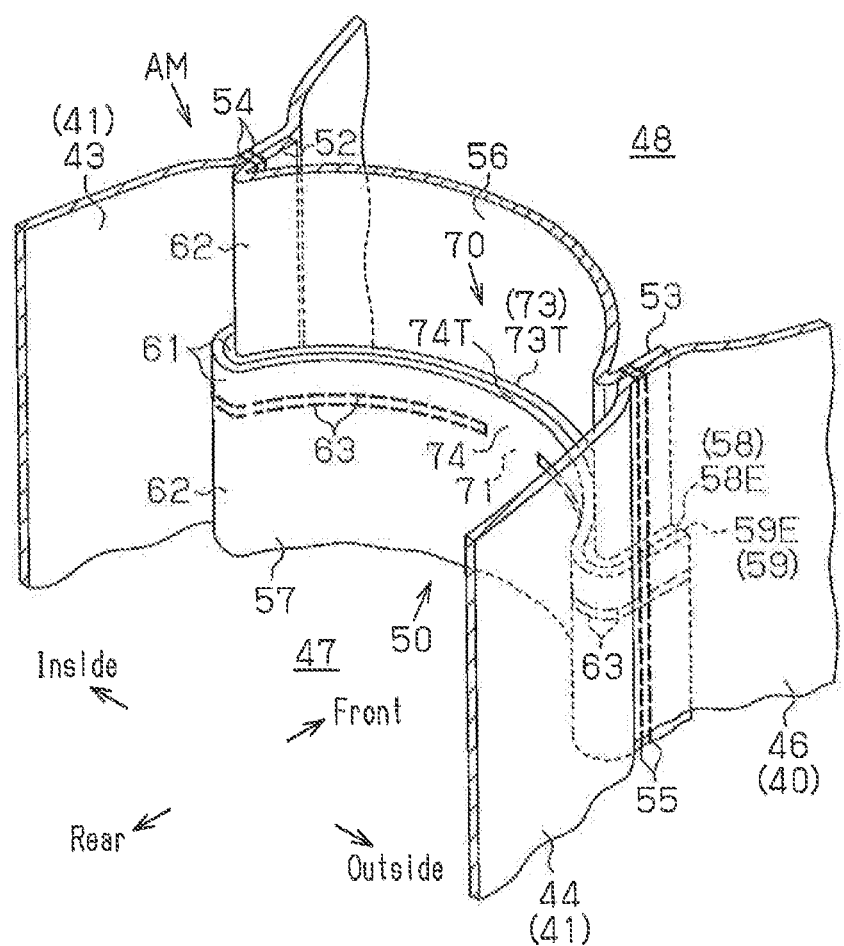
FIG. 9 is a partial perspective view depicting a portion in the vicinity of a pressure-regulating valve provided in the partitioning member of the embodiment seen from the upstream side.

The partitioning member 50 is pulled tight when the inflatable portion 46 is deployed and inflated as depicted in FIGS. 8 and 9. At this time, the length L1 of the partitioning member 50 in a direction of the folding line 51 (hereinafter referred to as the longitudinal direction) is larger than the width L2 of the partitioning member 50 in a direction perpendicular to the folding line 51 (hereinafter referred to as the transverse direction). The opposite end portions 52, 53 of the partitioning member 50 are joined to the fabric portions 43, 44 of the airbag 40 at outer joint parts 54, 55 extending generally in the up-down direction, respectively.

As the partitioning member 50 is joined to the airbag 40 in the aforementioned fashion, the partitioning member 50 spans between the inside fabric portion 43 and the outside fabric portion 44. When the airbag 40 has been deployed but not yet inflated, the partitioning member 50 is in a folded-in-half state (refer to FIGS. 5 and 7A). Also, when the airbag 40 has been deployed and inflated, the partitioning member 50 is stretched tight in the widthwise direction of the seat 12 (or of the vehicle 10) (refer to FIGS. 8 and 9) and thereby restrict, the width of the inflatable portion 46 of the airbag 40 in the widthwise direction of the vehicle 10.

The folded-in-half partitioning member 50 is joined to the airbag 40 at end portions on both sides of the folding line 51. Specifically, upper and lower ends of the partitioning member 50 are stitched along the aforementioned peripheral joint part 45 (refer to FIG. 7A) together with upper and lower ends of the two fabric portions 43, 44 of the airbag 40, respectively.

As depicted in FIGS. 4 and 7A, the partitioning member 50 divides the inflatable portion 46 of the airbag 40 into an upstream section 47 and a downstream section 48. When the inflatable portion 46 has been deployed and inflated, the partitioning member 50 is located in the vicinity of the middle of the upper part of the body of the occupant P in the front-rear direction. The upstream section 47 of the airbag 40 is deployed and inflated on the outer side of a body region from a rear part of the lumbar region PP to the shoulder PS when the occupant (adult) P having a standard body size is seated in an ordinary posture. The upstream section 47 is elongate in the up-down direction. To distinguish portions of the upstream section 47 that protect different body parts of the occupant P, an upper portion of the upstream section 47 that is deployed and inflated on the outer side of a region including at least a rear end part PSR and a middle part PSC of the shoulder PS is referred to as a shoulder-protecting portion 64. Also, a lower portion of the upstream section 47 that is deployed and inflated on the outer side of the rear part of the lumbar region PP is referred to as a lumbar-region-protecting portion 65.

In a process of airbag deployment and inflation, the shoulder-protecting portion 64 of the airbag 40 breaks the breakable portion 21 of the seat back 14 and pops out of the accommodation portion 18 (refer to FIG. 3). In contrast, the lumbar-region-protecting portion 65 of the airbag 40 is deployed and inflated within the seat back 14. FIGS. 1 and 7A illustrates a situation in which the airbag 40 has been deployed but not yet inflated and the lumbar-region-protecting portion 65 of the airbag 40 sticks out forward.

The downstream section 48 of the airbag 40, on the other hand, is deployed and inflated on the outer side of the thorax PT of the occupant (adult) P having the standard body size seated in the ordinary posture. Most of the downstream section 48 is located in front of the shoulder-protecting portion 64 of the airbag 40.

The inflator assembly 30 is located inside the upstream section 47 of the airbag 40. In the airbag 40 thus configured, the inflation gas G released from the inflator 31 is first supplied into the upstream section 47 of the airbag 40. The inflation gas G, which has been led through the upstream section 47, is then supplied into the downstream section 48, which is located adjacent to a forward part of the upstream section 47.

As depicted in FIGS. 8 and 9, the partitioning member 50 includes an upper part 56 and a lower part 57 that are arranged in the longitudinal (up-down) direction, which is the direction of the folding line 51. Each of the upper and lower parts 56, 57 of the partitioning member 50 is a sheet-like piece made of the same material as the fabric portions 43, 44 of the airbag 40.

End portions 58, 59 of the upper and lower parts 56, 57 of the partitioning member 50 are overlaid with edges 58E, 59E of the end portions 58, 59 aligned with each other, respectively, to form a pair of band-like overlapping portions 61. The upper and lower parts 56, 57 of the partitioning member 50 are joined to each other by a pair of inner joint parts 63 located in boundary areas between the overlapping portions 61 and other portions (hereinafter referred to as non-overlapping portions 62) of the upper and lower parts 56, 57 of the partitioning member 50. The two inner joint parts 63 extend along the direction (transverse direction) perpendicular to the folding line 51 and are located on both sides of an enjoined portion in the vicinity of the folding line 51. The inner joint parts 63 are separated from the edges 58E, 59E of the upper and lower parts 56, 57 of the partitioning member 50 by a specific distance in the up-down direction. The individual inner joint parts 63 are depicted by zigzag patterns in FIG. 5. The inner joint parts 63 are formed by stitching together the upper and lower parts 56, 57 of the partitioning member 50. This structure may however be modified so as to form the inner joint parts 63 by bonding the upper and lower parts 56, 57 with an adhesive.

The partitioning member 50 is provided with a pressure-regulating valve 70, which is located generally at a middle portion of the partitioning member 50 in both longitudinal and transverse directions. At an initial stage of a gas feeding period during which the inflation gas G is supplied to the inflatable portion 46 of the airbag 40, the pressure-regulating valve 70 closes to restrict the flow of the inflation gas G from the upstream section 47 to the downstream section 48 of the airbag 40. The pressure-regulating valve 70 opens when an external force is applied to the airbag 40 as a result of restraining the occupant P at a halfway point in time of the gas feeding period, so that the inflation gas G is allowed to flow downstream.

Described below is how the pressure-regulating valve 70 is constructed. The inner joint parts 63, which join the upper and lower parts 56, 57 of the partitioning member 50 to each other are not provided in an area straddling the folding line 51 located at the boundary area connecting the two overlapping portions 61 of the partitioning member 50 to the respective non-overlapping portions 62. The aforementioned unjoined portion located between the two inner joint parts 63 extends in the transverse (widthwise) direction of the vehicle 10 to form a slit, which constitutes an opening 71 interconnecting the upstream section 47 and the downstream section 48 of the airbag 40. The transverse (widthwise) direction of the vehicle 10 referred to herein is the same direction in which an impact is applied to the vehicle 10.

Parts of the pair of overlapping portions 61 close to the opening 71 form a pair of valve body elements 73, 74. More exactly, a portion between the opening 71 and the edge 58E of the end portion 58 of the partitioning member 50 constitutes the valve body element 73 while a portion between the opening 71 and the edge 59E of the end portion 59 of the partitioning member 50 constitutes the valve body element 74. When the two valve body elements 73, 74 come into contact with each other at least in part, at extreme ends 73T, 74T of the respective valve body elements 73, 74 near the edges 58E, 59E, for example, the pressure-regulating valve 70 closes and restricts the flow of the inflation gas G through the opening 71 and between the two valve body elements 73, 74 (refer to FIGS. 10A and 10B). Also, when the opening 71 is opened and the entirety of the valve body element 73 and the entirety of the valve body element 74 are separated from each other, the pressure-regulating valve 70 opens to allow the inflation gas G to flow through the opening 71 and between the two valve body elements 73, 74 (refer to FIG. 10C).

Further, the two overlapping portions 61 of the partitioning member 50, which has the valve body elements 73, 74, are located in the upstream section 47 before the inflatable portion 46 of the airbag 40 is deployed and inflated.

The two overlapping portions 61 are bent upward or downward (upward in this embodiment) in the boundary areas between the overlapping portions 61 and the non-overlapping portions 62 so that the overlapping portions 61 are stacked with the upper part 56 or the lower part 57 of the partitioning member 50. Further, the two band-like overlapping portions 61, which are bent, are joined to the respective fabric portions 43, 44 of the airbag 40 and the non-overlapping portions 62 of the partitioning member 50 by the outer joint parts 54, 55 thereof at both ends in the direction (transverse direction, or the widthwise direction of the vehicle 10) along the inner joint parts 63 (refer to FIGS. 5, 7A and 7B). The outer joint parts 54, 55 of the partitioning member 50 may be formed by stitching or by bonding by use of art adhesive.

The airbag 40 deployed but not inflated (refer to FIGS. 4 and 7A) is initially folded so that the airbag module AM can be accommodated in a compact fashion (hereinafter referred to as an accommodation state) as depicted in FIG. 3. This is for making the airbag module AM suitable for accommodation in the accommodating portion 18, which provides a limited space in the seat back 14.

The airbag module AM in the accommodation state is stored within the accommodating portion 18 with the inflator assembly 30 located rearward and most of the airbag 40 located forward. As previously mentioned, the bolts 34 extending from the retainer 32 and passed through the inside fabric portion 43 of the airbag 40 are further passed through the side frame portion 15 and fixed thereto by fastening nuts 36 on the bolts 34. As the nuts 36 are fastened on the bolts 34 in this fashion, the inflator assembly 30 is affixed to the side frame portion 15 together with the airbag 40.

As is apparent to those skilled in the art, the inflator assembly 30 may be affixed to the vehicle 10 (side frame portion 15) by different members from the aforementioned bolts 34 and nuts 36.

Referring again to FIG. 1, the side airbag apparatus includes an impact sensor 75 and a control unit 76 in addition to the aforementioned airbag module AM. The impact sensor 75 is an acceleration sensor, for example, located in the body-side portion 11 of the vehicle 10 (refer to FIG. 2). The impact sensor 75 detects an impact applied from the side to the body-side portion 11. The control unit 76 controls the working of the inflator 31 on the basis of a detection signal output from the impact sensor 75 upon detecting the impact.

While the vehicle 10 is equipped with a seat belt system for restraining the occupant P seated in the seat 12, the seat belt system is not illustrated in the accompanying drawings.

Figure 11:
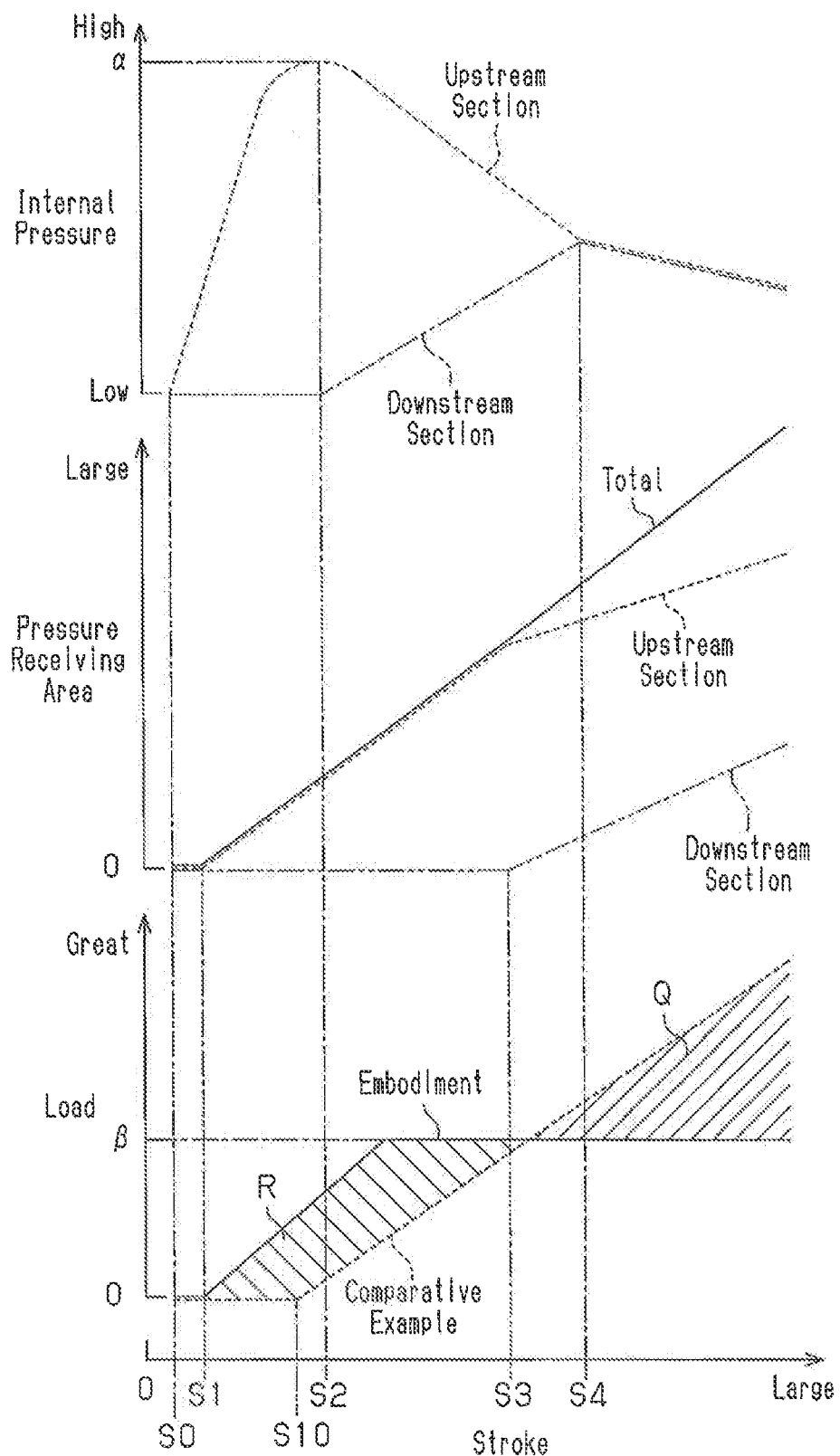
FIG. 11 is a characteristic chart representing a relationship among the internal pressures of the airbag, the pressure receiving areas of the occupant and a load applied thereto, and the amount of intrusion (stroke) of the body-side portion of the vehicle when the airbag is pushed against the occupant by the body-side portion intruding into the vehicle interior according to the embodiment.
Figure 12:
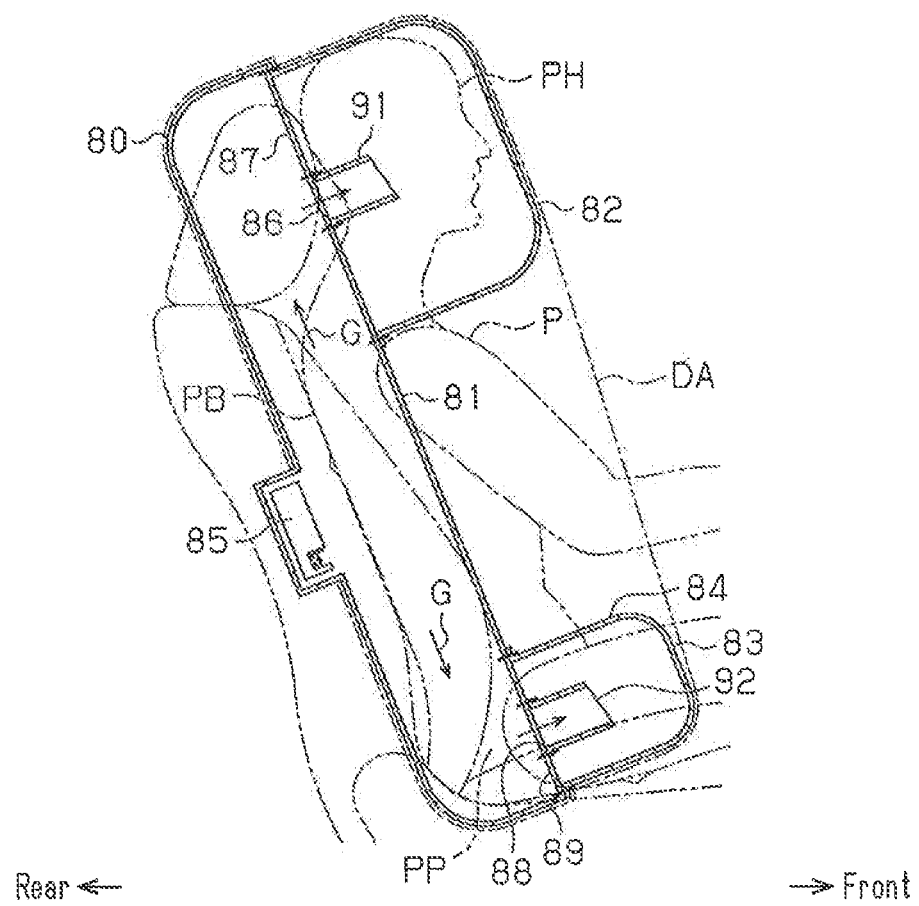
FIG. 12 is a cross-sectional side view depicting an airbag module of the prior art with a seat and an occupant, in which the airbag is neither deployed nor inflated.

The side airbag apparatus is configured as described in the foregoing. Operation of the side airbag apparatus of the present embodiment is now discussed with reference to a typical mode of operation represented in FIGS. 10A to 10C. FIGS. 10A to 10C are diagrams schematically representing how the pressure-regulating valve 70 varies in shape with the lapse of time after the beginning of the supplying of the inflation gas G. It is to be noted that FIGS. 10A to 10C do not illustrate details of the side airbag apparatus. FIG. 11 represents how internal pressures of the upstream section 47 and the downstream section 48 of the airbag 40 filled with the inflation gas G, pressure receiving areas of the occupant P that receive pressures from the upstream section 47 and the downstream section 48, and a load applied to the occupant P by the airbag 40 vary with the amount of intrusion (stroke) of the body-side portion 11 into the vehicle interior caused by a collision. The load is determined by a product of the internal pressures and the pressure receiving areas.

In the side airbag apparatus of the embodiment, the control unit 76 does not output the activation signal to the inflator 31 for activating the same when no impact is applied from the side to the vehicle 10 (body-side portion 11). Therefore, the inflator 31 does not supply the inflation gas G to the inflatable portion 46 (upstream section 47) of the airbag 40 in this situation and the airbag 40 continues to be stored in the accommodating portion 18 in the accommodation state together with the inflator assembly 30 (refer to FIG. 3) in a side collision and the like. At this point in time, the fabric portions 43, 44 of the airbag 40 are positioned close to each other and the partitioning member 50 is folded in half with the folding line 51 thereof located upstream of the two opposite end portions 52, 53. The two valve body elements 73, 74 are overlaid each other in the upstream section 47 of the airbag 40. The amount of intrusion (stroke) of the body-side portion 11 into the vehicle interior is 0 in this state. The internal pressures of the upstream section 47 and the downstream section 48 are low (approximately at atmospheric pressure), and the pressure receiving areas of the occupant P and the load applied thereto are both 0 at this time.

In contrast, if an impact of which force level is equal to or higher than a predetermined value is applied to the vehicle 10 (body-side portion 11) as a result of a collision, for instance, and the impact sensor 75 detects this situation while the vehicle 10 is running, the impact sensor 75 outputs a detection signal. Upon receiving this detection signal, the control unit 76 outputs the activation signal to the inflator 31 for activating the same. The amount of intrusion (stroke) of the body-side portion 11 into the vehicle interior caused at this time is expressed by S0 (FIG. 11). The gas generating agent contained in the inflator 31 generates the high-temperature and high-pressure inflation gas G in response to the activation signal received. The inflation gas G thus generated is first supplied into the upstream section 47 of the airbag 40, causing the upstream section 47 to be deployed and inflated.

The inflatable portion 46 of the airbag 40 incorporates the folded-in-half partitioning member 50 with the folding line 51 thereof located upstream of the two opposite end portions 52, 53. Moreover, the opposite end portions 52, 53 of the partitioning member 50 are joined to the fabric portions 43, 44 of the airbag 40 at the outer joint parts 54, 55, respectively (refer to FIG. 5). Also, the end portions (upper and lower end portions) of the partitioning member 50 on both sides of the folding line 51 are joined to the two fabric portions 43, 44 of the airbag 40 along the peripheral joint part 45 thereof, respectively (refer to FIG. 7A). Therefore, when the upstream section 47 of the airbag 40 begins to be deployed and inflated as stated above, the folded-in-half partitioning member 50 is pulled by the fabric portions 43, 44 and assumes the shape of a curved surface. As this curved surface of the partitioning member 50 receives tension in the longitudinal (up-down) direction and the transverse (widthwise) direction, the partitioning member 50 is stretched tight (refer to FIG. 8).

Internal pressure PI is applied to the two valve body elements 73, 74 located in the upstream section 47 of the airbag 40 in a direction (thickness direction) in which the valve body elements 73, 74 are overlaid. (refer to FIG. 10A). At this time, the internal pressure PI of the inflatable portion 46 of the airbag 40 is not so high as compared to that developed at a point in time when the inflatable portion 46 restrains the occupant P. This internal pressure PI keeps the valve body elements 73, 74 in tight contact with each other over an entire surface area, so that the valve body elements 73, 74 together create a self-sealing state by which the flow of the inflation gas G between the valve body elements 73, 74 is restricted. Further, the overlapping portions 61 of the partitioning member 50 bent and overlaid on the non-overlapping portions 62 thereof are pressed tight against the non-overlapping portions 62 by the internal pressure PI (refer to FIG. 9). This also makes it easier to close the two valve body elements 73, 74 together.

Referring now to FIG. 8, the partitioning member 50 is configured such that the length L1 in the longitudinal (up-down) direction is larger than the width L2 in the transverse (widthwise) direction (L1>L2). For this reason, the tension applied to the partitioning member 50 in the transverse (widthwise) direction is likely to become larger than the tension applied in the longitudinal (up-down) direction. Since the opening 71 in the partitioning member 50 extends in the transverse (widthwise) direction in which the larger tension is likely to be applied in this embodiment, the opening 71 tends to be closed.

Although the tensions applied to the partitioning member 50 in the transverse and longitudinal directions differ in strength as mentioned above, the tension is exerted in the longitudinal (up-down) direction, potentially causing the opening 71 to become open. Nevertheless, the two valve body elements 73, 74 are closed together at least at the extreme ends 73T, 74T thereof. This is because, even if such a force that tends to pull and open the opening 71 is exerted with the partitioning member 50 stretched tight, the force acting on the valve body elements 73, 74 becomes smaller in a direction going away from the opening 71. The force thus exerted is maximized at the opening 71 and minimized at the extreme ends 73T, 74T of the valve body elements 73, 74 so that the valve body elements 73, 74 are held closed together.

Further, the overlapping portions 61 of the partitioning member 50 bent toward the non-overlapping portions 62 thereof are joined to the respective fabric portions 43, 44 of the airbag 40 together with the opposite end portions 52, 53 by the outer joint parts 54, 55 at both ends in a direction in which the slit (inner joint parts 63) extends refer to FIG. 9) in the present embodiment. Thus, when the upstream section 47 of the airbag 40 is deployed and inflated, a strong tension is exerted not only on the partitioning member 50 in the transverse (widthwise) direction but also on the overlapping portions 61 in the same direction.

When at least parts of the two valve body elements 73, 74 come into contact with each other, the pressure-regulating valve 70 is brought into a closed state. Thus, the inflation gas G in the upstream section 47 of the airbag 40 is kept from flowing into the downstream section 48 thereof between the two valve body elements 73, 74 and through the opening 71 at this time. As the flow of the inflation gas G is restricted in this fashion, it is difficult for the inflation gas G to flow through the opening 71. The inflation gas G in the upstream section 47 does not flow into the downstream section 48 through the opening 71 at all or just flows in minute quantities. Consequently, the inflation gas G is held in the upstream section 47 in quantity and, when the amount of intrusion (stroke) of the body-side portion 11 into the vehicle interior reaches the aforementioned value S0, the internal pressure of the airbag 40, especially that of the upstream section 47, begins to increase.

In this embodiment, the inflatable portion 46 of the airbag 40 is divided into the upstream section 47 and the downstream section 48 by the partitioning member 50. The upstream section 47 has a smaller volume than that of the entire inflatable portion 46 (provided that the inflatable portion 46 is not divided into the two sections 47, 48). Therefore, the internal pressure of the upstream section 47 increases more quickly compared to a case where the inflatable portion 46 is not divided. In particular, the upstream section 47 is connected to the downstream section 48 only through a passage between the two valve body elements 73, 74 and, thus, the inflation gas G can never flow into the downstream section 48 without passing between the valve body elements 73, 74. For this reason, it is unlikely that the rate of increase in the internal pressure of the upstream section 47 would decrease as a result of the downstream flow of the inflation gas G.

Immediately after the beginning of the supplying of the inflation gas G, the airbag 40 (inflatable portion 46) is not in contact with the occupant P and, therefore, the pressure receiving areas of the occupant P and the load applied thereto are both 0.

Figure 6:
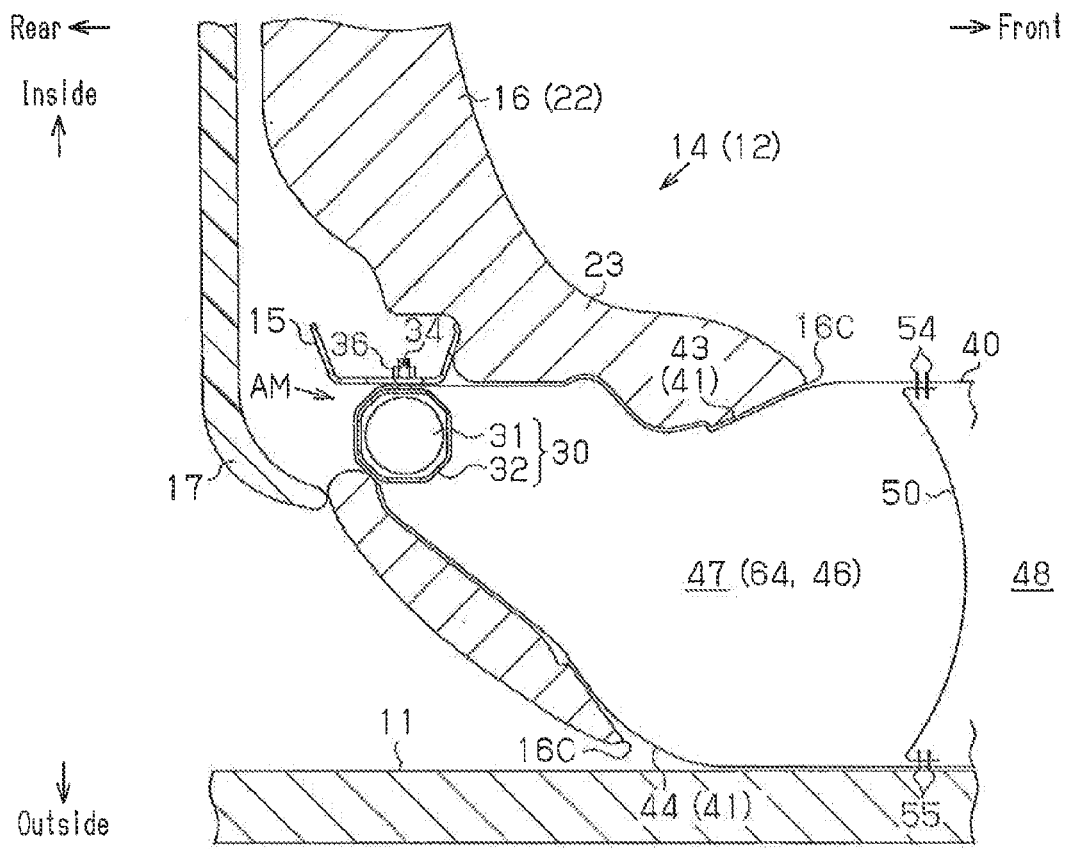
FIG. 6 is a partially cross-sectional plan view depicting a state in which the airbag has been deployed and inflated out of the seat with part of the airbag left within the seat back from a state depicted in FIG. 3.

Then, when the upstream section 47 of the airbag 40 is deployed and inflated as mentioned above, the upstream section 47 tends to be unfolded, reversing the earlier-described folding process of the upstream section 47. As the upstream section 47 is deployed and inflated while stretching out from a folded state, the seat pad 16 of the seat back 14 is pushed outward by the shoulder-protecting portion 64 of the airbag 40 and eventually broken at the breakable portion 21 (refer to FIG. 3). The shoulder-protecting portion 64 pops out forward through a broken part of the seat pad 16 with part of the shoulder-protecting portion 64 left within the accommodating portion 18 as depicted in FIG. 6.

Even after the shoulder-protecting portion 64 has popped out, the inflation gas G continues to be supplied in the upstream section 47 of the airbag 40. At this point in time, the shoulder-protecting portion 64 is deployed while stretching out forward between the body-side portion 11 and the shoulder PS of the occupant P seated in the seat 12 as depicted in FIG. 2. The shoulder-protecting portion 64, which has a higher internal pressure than the downstream section 48, is deployed and inflated on the outer side of the region of the body of the occupant P including at least the rear end part PSR and the middle part PSC of the shoulder PS as depicted in FIG. 7A. The shoulder PS has higher impact resistance than the thorax PT. The downstream section 48 is not fully inflated at this point or inflated only slightly and thus has a low internal pressure.

When the amount of intrusion (stroke) of the body-side portion 11 into the vehicle interior reaches value S1, the shoulder-protecting portion 64 begins to be pressed against the shoulder PS of the occupant P by the body-side portion 11. As the body-side portion 11 presses against the occupant P in this way, the shoulder PS is pushed inward into the vehicle interior (or in a direction going away from the body-side portion 11) and the occupant P is restrained chiefly by the upstream section 47 of the airbag 40.

Since the back PB of the occupant P has an outline that is curved inward of the vehicle toward the rear end, it is difficult to push the back PB farther inward into the vehicle interior by the upstream section 47. However, since the shoulder PS of the occupant P located on the outer side is not so curved inward into the vehicle interior as the back PB, the shoulder PS can be pushed inward more easily into the vehicle interior by the upstream section 47.

Also, the shoulder PS is a body region protruding most outward in the widthwise direction of the seat 12 (or outward toward the body-side portion 11 of the vehicle 10) among the upper part of the body of the occupant P so that the shoulder PS is nearest to the body-side portion 11. The distance between the body-side portion 11 and the upper part of the body of the occupant P is at a minimum at the shoulder PS before any impact is applied to the vehicle 10.

Therefore, compared to any part of the airbag 40 that pushes other regions of the upper part of the body of the occupant P, the shoulder-protecting portion 64 begins to push the upper part (shoulder PS) of the body of the occupant P with a small amount of inflation. The shoulder-protecting portion 64 begins to press against the occupant P in a short time after the beginning of deployment and inflation of the shoulder-protecting portion 64, that is, at an early point in time. Additionally, compared to the back PB, the shoulder PS has higher resistance to the impact applied from the side to the upper part of the body of the occupant P. The shoulder PS so characterized is forcefully pushed by shoulder-protecting portion 64 of the upstream section 47 of which internal pressure rises at an early point in time.

In contrast, the lumbar-region-protecting portion 65 of the airbag 40 is deployed and inflated within the seat back 14 and gains an increased internal pressure. The lumbar-region-protecting portion 65 thus inflated presses against a lower part of the outer lateral portion (side support portion 23) of the seat back 14. As a result, a portion of the seat 12 (side support portion 23) in the vicinity of the lumbar-region-protecting portion 65 swells forward and inward into the vehicle interior. The side support portion 23, which has so swollen, forcefully pushes the rear part of the lumbar region PP, which has the highest impact resistance within the upper part of the body of the occupant P, inward into the vehicle interior.

As the shoulder-protecting portion 64 presses against the shoulder PS and the lumbar-region-protecting portion 65 presses against the lumbar region PP in the above-described fashion, the occupant P is moved inward into the vehicle interior. Consequently, the distance between the occupant P and the body-side portion 11 is increased, thereby providing a space to allow the downstream section 48 of the airbag 40 to be deployed and inflated.

The larger the area of the shoulder PS that receives a pushing force applied by the shoulder-protecting portion 64 of the airbag 40, the more efficiently the shoulder-protecting portion 64 pushes the shoulder PS inward and moves the occupant P farther into the vehicle interior. As the region of the body of the occupant P including at least the rear end part PSR and the middle part PSC of the shoulder PS is thus pushed by the shoulder-protecting portion 64, the shoulder PS is pushed inward and the occupant P is moved farther into the vehicle interior.

The larger the area of the lumbar region PP that receives a pushing force applied by the lumbar-region-protecting portion 65 of the airbag 40, the more efficiently the lumbar-region-protecting portion 65 pushes inward the lumbar region PP and moves the occupant P farther into the vehicle interior. As at least the rear part of the lumbar region PP is thus pushed by the lumbar-region-protecting portion 65, the lumbar region PP is pushed inward and the occupant P is moved farther into the vehicle interior.

Since the upstream section 47 of the inflatable portion 46 of the airbag 40 is chiefly deployed and inflated in the initial stage of the gas feeding period, during which the inflation gas G is supplied into the inflatable portion 46 as mentioned above, the occupant P goes in contact with and receives pressure of the inflatable portion 46 mostly from the upstream section 47 thereof. Therefore, the surface area of the occupant P that receives pressure from the inflatable portion 46 (i.e., the pressure receiving area by the inflatable portion 46) equals the surface area of the occupant P that receives pressure from the upstream section 47 (i.e., the pressure receiving area by the upstream section 47) and is small. The pressure receiving area of the occupant P by the upstream section 47 becomes larger as the amount of intrusion (stroke) of the body-side portion 11 into the vehicle interior increases according to the impact caused by a side collision.

Impact load that the occupant P receives through the inflatable portion 46 also increases as the pressure receiving area of the occupant P and the internal pressure of the inflatable portion 46 increases. As mentioned earlier, the internal pressure of the upstream section 47 increases earlier. Therefore, the value S1 of the amount of intrusion. (stroke) of the body-side portion 11 into the vehicle interior at which the impact load begins to increase according to the embodiment is smaller than value S10 of the amount of intrusion (stroke) of the body-side portion 11 into the vehicle interior at which the impact load begins to increase if the inflatable portion 46 of the airbag 40 is not divided into the upstream section 47 and the downstream section 48 (Comparative Example represented in FIG. 11). In other words, the impact load begins to increase earlier than in a case where the inflatable portion 46 is not sectioned and thus quickly reaches a predetermined value β at which the upper part of the body of the occupant P is protected from the impact (as depicted in FIG. 11).

At this point in time, the two valve body elements 73, 74 are kept in tight contact with each other over the entire surface area thereof (or in a closed state) as mentioned above, allowing the inflation gas G to be supplied into the upstream section 47. When the amount of intrusion (stroke) of the body-side portion 11 into the vehicle interior reaches value S2, an external force applied by the body-side portion 11 to the airbag 40 causes the internal pressure of the upstream section 47 to rise up to value α and the pressure-regulating valve 70 to open.

It follows that, from a halfway point in time of the gas feeding period, during which the inflation gas G is supplied to the inflatable portion 46 of the airbag 40, the external force is applied to the inflatable portion 46 as a result of restraining the occupant P, so that the inflatable portion 46 is pushed and deformed in the transverse (widthwise) direction of the vehicle 10. Consequently, a high tension that has been applied to the partitioning member 50 in the transverse (widthwise) direction decreases and a tension applied in the longitudinal (up-down) direction increases.

Also, due to the aforementioned deformation of the inflatable portion 46, the internal pressure of the upstream section 47 further increases and the partitioning member 50 is pushed toward the downstream section 48 (refer to FIG. 10B) so that the tension applied to the partitioning member 50 changes. Then, the difference between the tensions applied in the longitudinal and transverse directions decreases as a result of the aforementioned change in the tensions. Consequently, deformation of the opening 71 located in the partitioning member 50 is allowed, and movement of the valve body elements 73, 74 located within the partitioning member 50 is allowed.

On the other hand, the overlapping portions 61 of the partitioning member 50 are overlaid on the non-overlapping portions 62 thereof and joined to the respective fabric portions 43, 44 of the airbag 40 by the outer joint parts 54, 55 at both ends in the transverse (widthwise) direction. Therefore, portions of the overlapping portions 61 close to the outer joint parts 54, 55 exert a strong force to maintain an overlapping state of the overlapping portions 61 and the non-overlapping portions 62 of the partitioning member 50. This force becomes smaller in a direction going away from the outer joint parts 54, 55 and reaches a minimum at a middle part of the overlapping portions 61 in the transverse (widthwise) direction, or at the two valve body elements 73, 74. For this reason, the overlapping portions 61 are deformed in the longitudinal (up-down) direction only at the valve body elements 73, 74 and nearby areas thereof when stretched in the transverse (widthwise) direction.

When the opening 71 of the partitioning member 50 opens to a certain extent, the two valve body elements 73, 74 of the overlapping portions 61 receive the high internal pressure PI from the upstream section 47 and pushed (turned back) toward the downstream section 48 of the airbag 40 through the opening 71. When the width W1 of the opening 71 in the up-down direction is narrow, the extreme ends 73T, 74T of the two valve body elements 73, 74 come into contact with each other so that the valve body elements 73, 74 are closed together at the extreme ends 73T, 74T (refer to FIG. 10B). This situation persists for a period of time when the aforementioned width W1 of the opening 71 is narrower than the sum of the widths W2 (2·W2) of the individual valve body elements 73, 74 (refer to FIG. 10C).

When the width W1 of the opening 71 becomes larger than the sum of the widths W2 (2·W2) of the two valve body elements 73, 74, the extreme ends 73T, 74T thereof are separated from each other (refer to FIG. 10C) and the pressure-regulating valve 70 opens. When the pressure-regulating valve 70 opens in this way, the inflation gas G within the upstream section 47 is allowed to flow into the downstream section 48 through the opening 71 and between the two valve body elements 73, 74.

When the downstream flow of the inflation gas G commences, the internal pressure of the upstream section 47, which has been increasing, begins to decrease. Because the body-side portion 11 continues to intrude farther inward into the vehicle interior, however, the upstream section 47 of the inflatable portion 46 of the airbag 40 is pushed by the occupant P and the pressure receiving area thereof by the upstream section 47 continues to increase.

Also, when the amount of intrusion (stroke) of the body-side portion 11 into the vehicle interior becomes equal to or larger than the value S2, the downstream section 48 begins to be deployed and inflated as the inflation gas G flows into the downstream section 48 and the internal pressure therein begins to increase. Consequently, the occupant P is pushed against not only the upstream section 47 but also the downstream section 48 of the inflatable portion 46 and, thus, the occupant P is restrained by both the upstream section 47 and the downstream section 48.

Further, when the amount of intrusion (stroke) of the body-side portion 11 into the vehicle interior reaches a value S3 shortly after the beginning of an increase in the internal pressure of the downstream section 48, the body-side portion 11 intruding into the vehicle interior causes the downstream section 48, in addition to the upstream section 47, to go into contact with the occupant P and begin to be pressed thereby. The upper part of the body of the occupant. P now begins to be restrained by both the upstream section 47 and the downstream section 48 and the surface area of the occupant P that receives pressure from the downstream section 48 (i.e., the pressure receiving area by the downstream section 48) begins to increase.

The internal pressure of the upstream section 47 and that of the downstream section 48 become equal to each other when the amount of intrusion (stroke) of the body-side portion 11 into the vehicle interior reaches value S4.

After the pressure-regulating valve 70 has opened (or when the amount of intrusion (stroke) of the body-side portion 11 into the vehicle interior becomes equal to or larger than the value S2) as mentioned above, the internal pressure of the upstream section 47 drops and the internal pressure of the downstream section 48 rises. Also, the pressure receiving areas of the occupant P by the upstream section 47 and the downstream section 48 both increase with a time difference. Therefore, when the amount of intrusion (stroke) of the body-side portion 11 into the vehicle interior becomes equal to or larger than the value S2, the total load applied to the occupant P by the entire inflatable portion 46 of the airbag 40, that is, the sum of the load applied by the upstream section 47 and the load applied by the downstream section 48, is smaller than the maximum value of the total load applied to the occupant P in the case where the inflatable portion 46 is not sectioned (Comparative Example represented in FIG. 11) and takes generally a constant value (predetermined value β).

Also, the total load applied to the occupant P by the inflatable portion 46 quickly increases in the initial stage of the gas feeding period, during which the inflation gas G is supplied, and is maintained at a low level (approximately at the predetermined value β) thereafter. For this reason, the amount of energy absorbed by the inflatable portion 46 of the airbag 40 of the embodiment is approximately equal to the amount of energy absorbed by the inflatable portion 46 in the case where the inflatable portion 46 is not sectioned (Comparative Example represented in FIG. 11). As compared to the case where the inflatable portion 46 is not sectioned (Comparative Example of FIG. 11), a load characteristic with respect to the inward stroke of the body-side portion 11 according to the embodiment can be portrayed by a pictorial representation in which a high-load region in a latter half of the gas feeding period, during which the inflation gas G is supplied to the inflatable portion 46 (region Q hatched by parallel lines drawn rightwardly upward in FIG. 11), is shifted to a low-load region in a first half of the gas feeding period (region R hatched by parallel lines drawn rightwardly downward in FIG. 11). The regions Q and R have different shapes but approximately the same area as illustrated.

As the downstream section 48 of the airbag 40 is inflated as mentioned above, the downstream section 48 tends to be unfolded through the reversed order of the earlier-described folding process of the downstream section 48. In this process of inflation, the downstream section 48 is deployed and inflated on the outer side of the thorax PT, which has lower impact resistance than the shoulder PS and the lumbar region PP, at an internal pressure lower than that of the upstream section 47. At this point in time, the distance between the body-side portion 11 and the occupant P has already been increased by the upstream section 47 (including the shoulder-protecting portion 64 and the lumbar-region-protecting portion 65) so that there is provided a sufficient space for deploying and inflating the downstream section 48. Thus, the downstream section 48 can be deployed and inflated forward into this space more easily compared to a case where the aforementioned distance is not increased yet (refer to FIG. 2).

The airbag 40 is positioned between the upper part of the body of the occupant P and the body-side portion 11 of the vehicle 10, which intrudes farther into the vehicle interior, in the above-described fashion. The upper part of the body of the occupant P is pushed in the vehicle interior and restrained by the airbag 40, which has been deployed and inflated. Consequently, the inflatable portion 46 of the airbag 40 alleviates the impact transmitted from the side through the body-side portion 11 to the upper part of the body of the occupant P to protect the same.

The side airbag apparatus of the present embodiment described so far in detail confers the following advantages:

(1) The inflatable portion 46 of the airbag 40 is divided by the partitioning member 50 into the upstream section 47, into which the inflation gas G is first supplied, and the downstream section 48, into which the inflation gas G is supplied through the upstream section 47, the downstream section 48 adjoining the upstream section 47 at the front thereof. The partitioning member 50 is provided with the pressure-regulating valve 70 having the opening 71 and the pair of valve body elements 73, 74. Further, the upstream section 47 includes the shoulder-protecting portion 64, which is deployed and inflated on the outer side of the region of the body of the occupant P including at least the rear end part PSR and the middle part PSC of the shoulder PS (FIG. 7A).

It is therefore possible to forcefully push inward the shoulder PS, which has high impact resistance among a side region of the body of the occupant P, by the shoulder-protecting portion 64 of the upstream section 47, of which the internal pressure rises at an early point in time and efficiently move the occupant P farther into the vehicle interior. As a consequence, it is possible to increase the distance between the body-side portion 11 and the occupant P and thereby provide a space for deploying and inflating the downstream section 48. This makes it possible to reliably deploy and inflate the downstream section 48 and provide improved performance for protecting the occupant P.

(2) The downstream section 48 is configured to be located adjacent to the shoulder-protecting portion 64 at the front thereof so that the downstream section 48 is deployed and inflated on the outer side of the thorax PT of the occupant P (FIG. 7A).

Thus, in an initial stage of restraining the occupant P by the downstream section 48 of the airbag 40, the internal pressure of the downstream section 48 is not so high as that of the upstream section 47 (shoulder-protecting portion 64). The downstream section 48 so inflated in this stage can push against the thorax PT having lower impact resistance than the shoulder PS among the upper part of the body of the occupant P. Consequently, it is possible to push the shoulder-protecting portion 64 and the downstream section 48 against the occupant P at stiffness corresponding to the impact resistance of each body part of the occupant P and effectively protect the shoulder PS and the thorax PT from an impact.

(3) The airbag 40 further includes the lumbar-region-protecting portion 65 in the upstream section 47, and the lumbar-region-protecting portion 65 is deployed and inflated on the outer side of the rear part of the lumbar region PP of the occupant P.

Thus, when an impact is supplied from the side to the upper part of the body of the occupant P, it is possible to push the lumbar-region-protecting portion 65 of the upstream section 47, of which the internal pressure rises at an early point in time against the lumbar region PP, which has high impact resistance like the shoulder PS. Consequently, it is possible to increase the distance between the body-side portion 11 and the occupant P by moving the occupant P farther into the vehicle interior and thereby provide a space for deploying and inflating the downstream section 48 in an accelerated manner. This makes it possible to further improve the performance for protecting the occupant P.

(4) The airbag 40, which is stored in the accommodating portion 18 located within the seat 12, is configured such that the lumbar-region-protecting portion 65 is deployed and inflated within the seat back 14.

Therefore, the lumbar-region-protecting portion 65 of the airbag 40 pushed by the side support portion 23 of the seat back 14 inflates forward and inward so that the occupant P is pushed and moved farther into the vehicle interior.

(5) The end portions 58, 59 of the upper and lower parts 56, 57 of the partitioning member 50 are overlaid with the edges 58E, 59E of the end portions 58, 59 aligned with each other, respectively, to form the pair of band-like overlapping portions 61. Further, the partitioning member 50 is formed by joining the upper and lower parts 56, 57 thereof by the pair of inner joint parts 63 provided along the boundary areas between the two each overlapping portions 61 and non-overlapping portions 62. The upper and lower parts 56, 57 are not joined together in an area between the two inner joint parts 63 and the opening 71 is formed in this area of the partitioning member 50. Parts of the two overlapping portions 61 close to the opening 71 form the valve body elements 73, 74 (FIG. 9).

It is therefore possible to form the partitioning member 50 together with the opening 71 and the two valve body elements 73, 74 at one time by joining the overlapping portions 61 and the non-overlapping portions 62 of the upper and lower parts 56, 57 along the boundary areas thereof with part of the boundary areas left unjoined. This means that no special work load is required for forming the opening 71 and the pair of valve body elements 73, 74.

In particular, the two valve body elements 73, 74 are formed integrally with the partitioning member 50. More exactly, one valve body element 73 is formed integrally with the upper part 56 of the partitioning member 50 while the other valve body element 74 is formed integrally with the lower part 57. Therefore, compared to a case where the two valve body elements 73, 74 are formed with components differing from the partitioning member 50 (i.e., the upper and lower parts 56, 57), it is possible to reduce the number of components. Additionally, it is not necessary to join any separate components to the upper and lower parts 56, 57 of the partitioning member 50.

(6) An upper part of the inflatable portion 46 of the airbag 40 is divided by the partitioning member 50 into front and rear sections (i.e., the shoulder-protecting portion 64 and the downstream section 48). As the partitioning member 50 is provided with the pressure-regulating valve 70, the downstream section 48 is not deployed or inflated at an early stage of deployment and inflation of the inflatable portion 46 (before the shoulder-protecting portion 64 restrains the occupant P).

Therefore, even if an obstacle exists in an area where the downstream section 48 will be deployed and inflated (at the front of the seat back 14) in the early stage of deployment and inflation of the inflatable portion 46, it is possible to prevent the downstream section 48 from pushing against the obstacle.

The foregoing embodiment of the present invention may be modified as described below.

<Modifications of Partitioning Member 50>

At least one of the upper and lower parts 56, 57 of the partitioning member 50 may be made of two pieces of cloth that are joined together along the folding line 51.

The opposite end portions 52, 53 of the partitioning member 50 are joined to the fabric portions 43, 44 of the airbag 40 at the outer joint parts 54, 55, respectively. The outer joint parts 54, 55 may be located within the upstream section 47 or within the downstream section 48.

Also, the partitioning member 50 may be configured such that one of the outer joint parts 54, 55 is located within the upstream section 47 and the other within the downstream section 48.

The opening 71 and the inner joint parts 63 need not necessarily be formed in the direction perpendicular to the folding line 51 of the partitioning member 50 but may be formed in a direction obliquely intersecting the folding line 51 or along the folding line 51.

The partitioning member 50 may be made of a single component (a piece of cloth). Areas of the overlapping portions 61 of the partitioning member 50 that function as the valve body elements 73, 74 are portions corresponding to the opening 71 (i.e., portions close to the opening 71, more exactly, portions between the opening 71 and the edges 58E, 59E). Therefore, if at least the extreme ends 73T, 74T of the valve body elements 73, 74 are to be held in contact with each other to close the valve body elements 73, 74 together while the upstream section 47 is being deployed and inflated, parts of the overlapping portions 61 located apart from the opening 71 may be modified in shape or structure. For example, the parts of the overlapping portions 61 located apart from the opening 71 may be joined together entirely or in part. In this case, the parts of the overlapping portions 61 may be joined together by stitching or adhesive bonding. If the structure of the overlapping portions 61 located apart from the opening 71 is so modified, it is possible to cause only the areas of the overlapping portions 61 corresponding to (close to) the opening 71 to function as the two valve body elements 73, 74 and prevent areas of the overlapping portions 61 not corresponding to (apart from) the opening 71 from unnecessarily moving, a phenomenon in which the overlapping portions 61 flutter in part.

One of other forms of modifications that may be made is to form a notch at least in part of the areas of the overlapping portions 61 located apart from the opening 71.

Also, the partitioning member 50 and the valve body elements 73, 74 may be made of different materials.

The folding line 51, along which the partitioning member 50 is folded in half, may be slightly inclined with respect to the up-down direction of the airbag module AM.

A portion where the upper and lower parts 56, 57 of the partitioning member 50 are not joined to each other by the two inner joint parts 63 need not necessarily be located in the area straddling the folding line 51 but may be provided in an area shifted from the folding line 51 in a direction perpendicular thereto.

The partitioning member 50 may be provided with a plurality (more than one pair) of inner joint parts 63 having a plurality of openings formed therebetween.

Also, the pair of overlapping portions 61 including the two valve body elements 73, 74 may be located in the downstream section 48, instead of the upstream section 47, before the inflatable portion 46 of the airbag 40 is deployed and inflated.

The partitioning member 50, which is folded in half along the folding line 51 such that the opposite end portions 52, 53 of the partitioning member 50 face close to each other, may be located in the inflatable portion 46 of the airbag 40, which has been deployed but not yet inflated under conditions where the folding line 51 is located downstream of the opposite end portions 52, 53. In this case, the overlapping portions 61 including the two valve body elements 73, 74 may be located within the downstream section 48 of the airbag 40 before the inflatable portion 46 thereof is deployed and inflated.

A pair of band-like overlapping portions may be formed with the end portions 58, 59 of the upper and lower parts 56, 57 of the partitioning member 50 overlaid with each other under conditions where the edges 58E, 59E of the end portions 58, 59 are not aligned with each other.

<Modifications of Inflatable Portion 46>

While almost the entirety of the airbag 40 may be formed of the inflatable portion 46 thereof as in the foregoing embodiment, the airbag 40 may be configured to partially have a non-inflatable portion, into which the inflation gas G is not supplied.

The inflatable portion 46 may be divided into three or more sections by a plurality of partitioning members. In this case, among any two adjacent sections divided by one of the partitioning members in the flow direction of the inflation gas G, one located on an upstream side is referred to as an upstream section and the other located on a downstream side is referred to as a downstream section. A pressure-regulating valve is provided in the partitioning member located between the upstream section and the downstream section.

While the lumbar-region-protecting portion 65 of the airbag 40 should be deployed and inflated on the outer side of at least the rear part of the lumbar region PP, the lumbar-region-protecting portion 65 may be deployed and inflated on the outer side of the entire lumbar region PP.

The lumbar-region-protecting portion 65 may be configured to break the seat pad 16 of the seat back 14 and pop out forward.

<Modification of Inflator Assembly 30>

The inflator assembly 30 may be provided outside the airbag 40. In this case, the side airbag apparatus may be configured such that the inflator 31 and the upstream section 47 are interconnected by a pipe and the inflation gas G is supplied from the inflator 31 to the upstream section 47 through this pipe.

<Modification of Accommodating Portion 18 of Airbag Module AM>

The side airbag apparatus may be configured such that the accommodating portion 18 is located in the body-side portion 11 of the vehicle 10, instead of the seat back 14 of the seat 12, and the airbag module AM is incorporated in the accommodating portion 18.

<Other Modifications>

The present invention is applicable to a side airbag apparatus in which the upstream section 47 protects a body region including at least the rear end part PSR and the middle part PSC of the shoulder PS from an impact caused by a side collision, for instance. Thus, the invention is also applicable to a side airbag apparatus configured to protect not only the earlier-mentioned portions of the body as the lumbar region PP, the thorax PT and the shoulder PS but also various portions, such as a body region from the thorax PT (shoulder PS) to the head PH and a body region from the lumbar region PP to the head PH, from an impact caused by a side collision, for instance.

The present invention is also applicable to a side airbag apparatus designed to protect the occupant P from an impact applied from the side (along the longitudinal direction of the vehicle 10) to the seat 12, which is installed in such a way that the seat back 14 is not oriented forward but in a lateral direction of the vehicle 10.

Vehicles to which the side airbag apparatus according to the present invention is applied include various industrial vehicles in addition to private automobiles.

Furthermore, the vehicles mentioned thus far in the present description include any kind of vehicles for transpiration intended to carry any seated person. For examples, vehicles include aircrafts and vessels.

Therefore, the present examples and embodiments are to be considered as illustrative and not restrictive and the invention is not to be limited to the details given herein, but may be modified within the scope and equivalence of the appended claims.

The invention claimed is:

1. A side airbag apparatus comprising:
   a gas generating source, which supplies inflation gas in response to an impact applied from a side of a seat of a vehicle; and
   an airbag having an inflatable portion, which is deployed and inflated forward by the inflation gas on a side of an occupant seated in the seat to restrain the occupant, and a partitioning member, which divides the inflatable portion into an upstream section into which the inflation gas is supplied from the gas generating source and a downstream section located in front of and adjacent to the upstream section, wherein
   the partitioning member includes a valve capable of selectively allowing and restricting flow of the inflation gas from the upstream section to the downstream section, the partitioning member having an opening and a pair of valve body elements,
   in an initial stage of a gas feeding period during which the inflation gas is supplied, the pair of valve body elements are pushed to remain in contact with each other by the inflation gas fed into the upstream section to restrict the flow of the inflation gas from the upstream section to the downstream section through the opening,
   in a state in which the upstream section has inflated and restrained the occupant, the pair of valve body elements are separated from each other to allow the flow of the inflation gas through the opening in the partitioning member when the partitioning member is caused to warp by an external force exerted from the occupant as a result of restraining the occupant, and
   the upstream section has a shoulder-protecting portion, which is deployed and inflated on a side of a region of the occupant including at least a rear end part and a middle part of a shoulder of the occupant,
   in the initial stage of the gas feeding period, internal pressure by the inflation gas keeps the valve body elements in tight contact with each other over an entire surface area so that the valve body elements together create a self-seating state.

2. The side airbag apparatus according to claim 1, wherein the downstream section is located in front of and adjacent to the shoulder-protecting portion and is deployed and inflated on a side of the thorax of the occupant.

3. The side airbag apparatus according to claim 1, wherein the upstream section of the airbag further has a lumbar-region-protecting portion, which is deployed and inflated on a side of the lumbar region of the occupant.

4. The side airbag apparatus according to claim 3, wherein the airbag is stored inside the seat and the lumbar-region-protecting portion is deployed and inflated within the seat.

* * * * *